(12) United States Patent
Kanehisa

(10) Patent No.: US 6,447,417 B2
(45) Date of Patent: Sep. 10, 2002

(54) DRIVE FORCE TRANSMISSION MECHANISM FOR HYBRID VEHICLE

(75) Inventor: Takanori Kanehisa, Hachiouji (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/796,727

(22) Filed: Mar. 2, 2001

(30) Foreign Application Priority Data

Mar. 6, 2000 (JP) ........................................ 2000-060579

(51) Int. Cl.[7] ........................... B60K 17/04; B60K 9/00; F16H 61/00
(52) U.S. Cl. ............................ 475/5; 475/10; 475/207; 475/218; 475/302; 180/65.1
(58) Field of Search ............................ 475/5, 10, 207, 475/218, 302, 4; 477/3, 5, 6, 20, 15; 180/65.1, 65.2, 165; 701/22, 51, 87; 290/45

(56) References Cited

U.S. PATENT DOCUMENTS 6,026,921 A * 2/2000 Aoyama et al. .......... 180/65.2
6,083,138 A * 7/2000 Aoyama et al. ................ 477/5
6,299,563 B1 * 10/2001 Shimasaki .................... 477/5
2001/0019980 A1 * 9/2001 Kanehisa ..................... 475/5

FOREIGN PATENT DOCUMENTS

JP  11-241624  9/1999

* cited by examiner

*Primary Examiner*—Douglas C. Butler
(74) *Attorney, Agent, or Firm*—Foley & Lardner

(57) ABSTRACT

A first clutch (2) is connected to an engine (1) of a hybrid vehicle. A motor/generator (6) is connected to an output shaft (4) of the first clutch (2) through a planetary gear set (3). A second clutch (10) is provided which connects an input shaft (5) of an automatic transmission (7) to the output shaft (4) so as to move the vehicle forward, and which connects the input shaft (5) to the motor/generator (6) so as to move the vehicle rearward. The second clutch (10) preferably comprises a dog clutch. When the vehicle commences forward motion, the torque of the motor/generator which is input to the automatic transmission (7) can be increased since the planetary gear set (3) decreases the rotation speed of the motor/generator (6) and transmits it to the output shaft (4).

7 Claims, 12 Drawing Sheets

DRIVE FORCE TRANSMISSION MECHANISM FOR HYBRID VEHICLE

FIELD OF THE INVENTION

This invention relates to a drive force transmission in a hybrid vehicle.

BACKGROUND OF THE INVENTION

Tokkai Hei 11-241624 published by the Japanese Patent Office in 1999 discloses a hybrid vehicle which combines an electric motor with an engine as a source of drive force.

A first electric motor in this hybrid vehicle is directly connected to an input shaft of an automatic transmission. An engine is also connected to the input shaft through a clutch. The vehicle starts moving by using only the motive force of the first electric motor while the clutch is disengaged.

After the vehicle has started, the engine is started by a second electric motor. While the vehicle is running, the engine drives the second electric motor as a generator to charge a battery. When the load on the first electric motor increases during acceleration, the clutch is engaged, and the motive force of the engine is input to the automatic transmission. The motive force of the engine increases the drive force of the vehicle by assisting the motive force of the first electric motor.

SUMMARY OF THE INVENTION

The first electric motor and engine of the hybrid vehicle are directly connected when the clutch is engaged and the first electric motor rotates at the same speed as the engine.

It is often the case that high-load conditions including vehicle acceleration coincide with low engine rotation speeds, However, operational efficiency of the electric motor is low in low rotation speed regions.

In other words, it is difficult to obtain a preferred operational efficiency of the engine and of motor at the same time when the vehicle is running on both the engine and motor.

Of course, an electric motor of a larger output can be used in order to increase the vehicle drive force, but such a motor generally has larger volume and weight.

Furthermore in this hybrid vehicle, it is indispensable to provide a forward/reverse change-over mechanism between the first electric motor and the automatic transmission so as to allow the forward and reverse motions of the vehicle.

It is therefore an object of this invention to improve the energy efficiency of a hybrid vehicle.

It is a further object of this invention to downsize the electric motor while maintaining the generated torque of the electric motor.

It is yet a further object of this invention to simplify the structure of a forward/reverse change-over mechanism.

In order to achieve the above objects, this invention provides a drive force transmission mechanism for such a hybrid vehicle that comprises an engine and a motor/generator as a motive force source. The mechanism comprises a first clutch connected to the engine, the first clutch comprising an output shaft that rotates together with the engine when the first clutch is engaged;

a planetary gear set connecting the motor/generator to the output shaft;

an automatic transmission comprising an input shaft, the hybrid vehicle running in accordance with an output rotation of the automatic transmission; and a second clutch selectively connecting the input shaft to the motor/generator and to the output shaft.

The details as well as other features and advantages of this invention are set forth in the remainder of the specification and are shown in the accompanying drawings.

DESCRIPTION OF THE PREFERRED EMBODIMENTS

Figure 1:
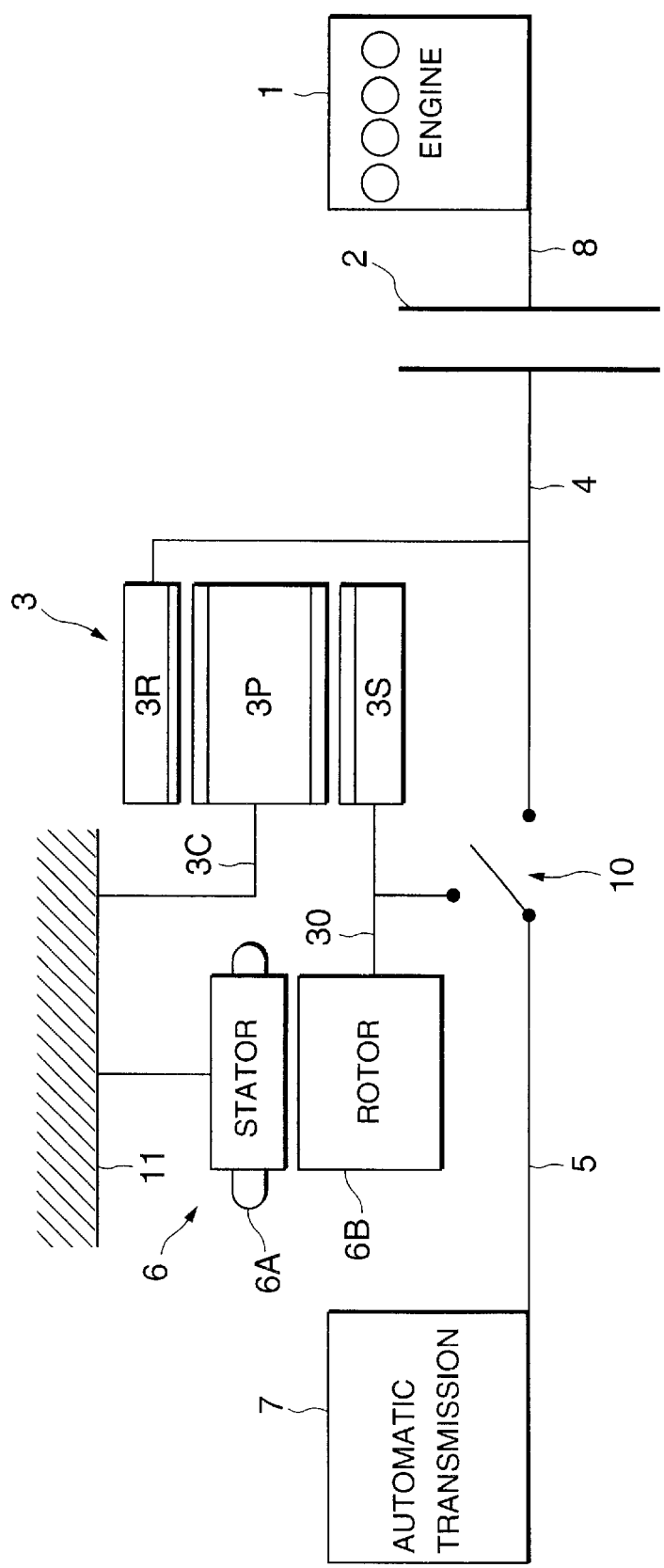
FIG. 1 is a schematic diagram of a drive force transmission mechanism for a hybrid vehicle according to this invention.

Referring to FIG. 1 of the drawings, a drive force transmission mechanism for a hybrid vehicle according to this invention comprises a start-up clutch 2, a planetary gear set 3, a forward/reverse change-over clutch 10 and an automatic transmission 7.

The hybrid vehicle comprises an engine 1 and a motor/generator 6 as sources of drive force. Drive wheels (not shown) are provided which are rotated by the rotational output of the automatic transmission 7. The engine 1 is a sparking ignition gasoline engine.

Figure 2:
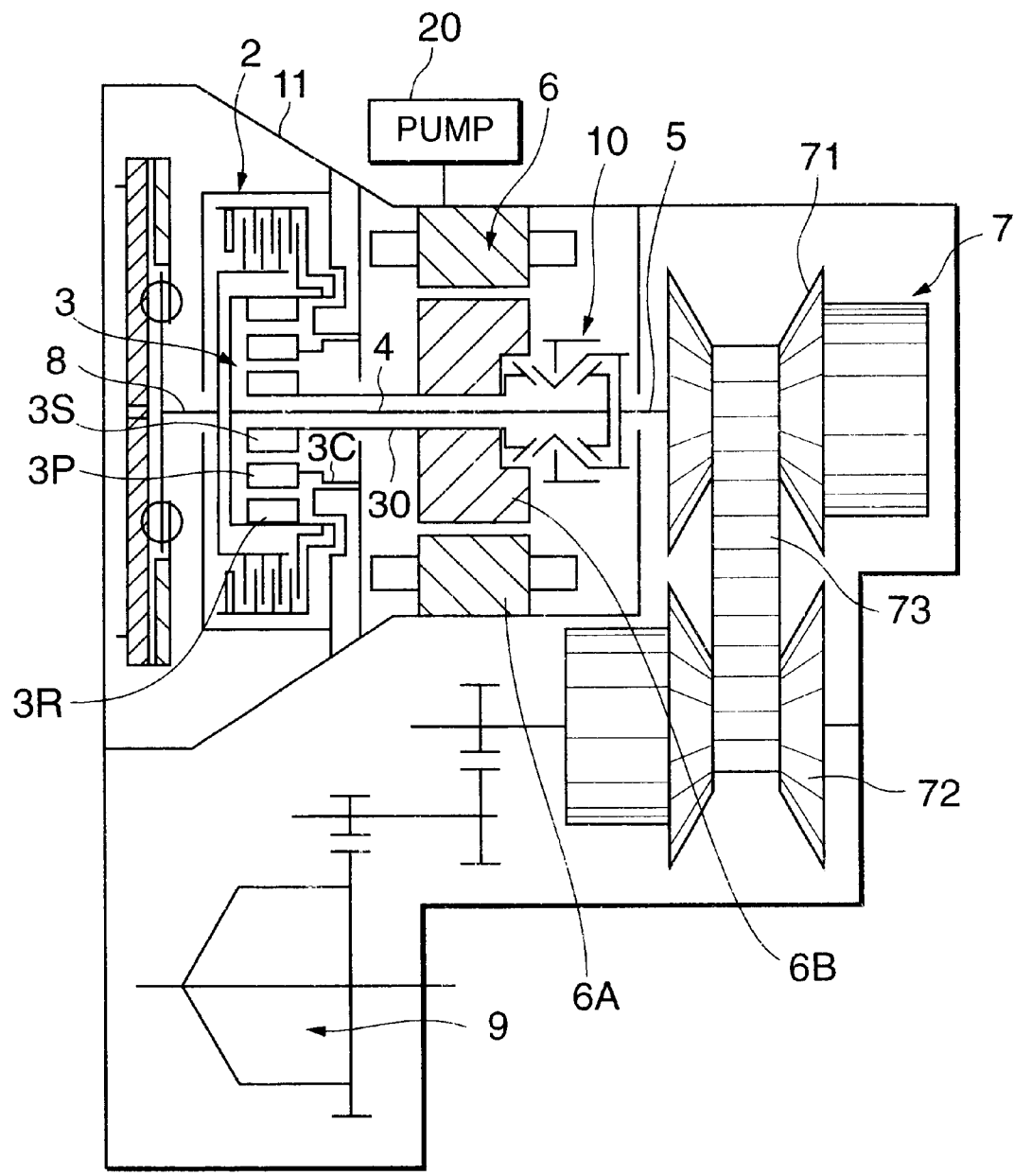
FIG. 2 is a schematic diagram of a drive force transmission unit into which the drive force transmission mechanism is integrated.

The start-up clutch 2, the planetary gear set 3, the motor/generator 6 and the forward/reverse switching clutch 10 are housed in a casing 11 as shown in FIG. 2.

An output shaft 8 of the engine 1 is connected to the start-up clutch 2. The start-up clutch 2 comprises for example an oil pressure driven multi-plate clutch. An output shaft 4 of the start-up clutch 2 is connected to a ring gear 3R of the planetary gear set 3. The output shaft 4 is connected to an input shaft 5 of the automatic transmission 7 through the forward/reverse change-over clutch 10.

The motor/generator 6 is a synchronous motor/generator which can arbitrarily select positive and reverse rotation, and comprises a stator 6A and a rotor 6B. The stator 6A is fixed to the casing 11. The rotor 6B rotates in response to a current supplied to coils provided in the stator 6A. The rotor 6B generates a current in the coils of the stator 6A in response to an external rotational input. The coils are connected to a battery 51 shown in FIG. 3 and a current supplied from the battery 51 operates the motor/generator 6 as an electric motor. On the other hand, a current generated by the external rotational input charges the battery 51. The operation of the motor/generator 6 as described above is controlled by a control current supplied to the coils from an inverter 50.

The rotor 6B comprises a rotation shaft 30. The rotation shaft 30 is connected to the sun gear 3S of the planetary gear mechanism 3 as shown in FIG. 1. The sun gear 3S of the planetary gear mechanism 3 is engaged with a ring gear 3R through a plurality of planet gears 3P. The planet gears 3P are respectively supported by a planet carrier 3C. The planet carrier 3C is fixed to the casing 11. As a result, the planet gears 3P rotate in response to the relative rotation of a ring gear 3R and a sun gear 3S and revolution about the sun gear 3S is prevented.

This structure allows the planetary gear set 3 to reduce the rotation speed of the rotation shaft 30 and transmit it to the output shaft 4 of the start-up clutch 2. Alternatively, the rotation speed of the output shaft 4 is increased and transmitted to the rotation shaft 30. This function may be realized by a simple gear unit which meshes with the two gears. However the two gears must not be disposed co-axially in such an arrangement. The use of a planetary gear set 3 allows the gear 3S and 3R to be disposed co-axially which thus reduces the volume of the drive force transmission mechanism.

The rotation shaft 30 is connected to an input shaft 5 of the automatic transmission 7 through the forward/reverse change-over clutch 10. The forward/reverse change-over clutch 10 comprises a dog clutch for example.

The forward/reverse change-over clutch 10 comprises a forward position which connects the input shaft 5 to the output shaft 4 of the start-up clutch 2, a reverse position which engages the input shaft 5 with the rotation shaft 30 of the motor/generator 6 and a neutral position in which the input shaft 5 is not connected to the output shaft 4 or the rotation shaft 30. These positions are switched by an actuator (not shown) which is driven by a signal from a hybrid controller 100 shown in FIG. 3. A dog clutch having this type of function is simpler in comparison to a conventional forward/reverse change-over mechanism.

Referring now to FIG. 2 of the drawings, the automatic transmission 7 comprises a V-belt type continuously variable transmission, The rotation of the input shaft 5 of the automatic transmission 7 is transmitted to a differential 9 through a primary pulley 71, a V-belt 73 and a secondary pulley 72. The differential 9 is connected to drive wheels (not shown) of the vehicle. The automatic transmission 7 realizes an arbitrary speed ratio by varying the groove width of the primary pulley 71 and the secondary pulley 72 accommodating the V-belt 73 with an oil pressure. A normal automatic transmission may be used instead of the continuously variable transmission.

An oil pressure required for the operation of the start-up clutch 2 and the automatic transmission 7 is supplied from an oil pump 20. The oil pump 20 is driven by a designated motor to supply an oil pressure also when the engine 1 is stopped.

Figure 3:
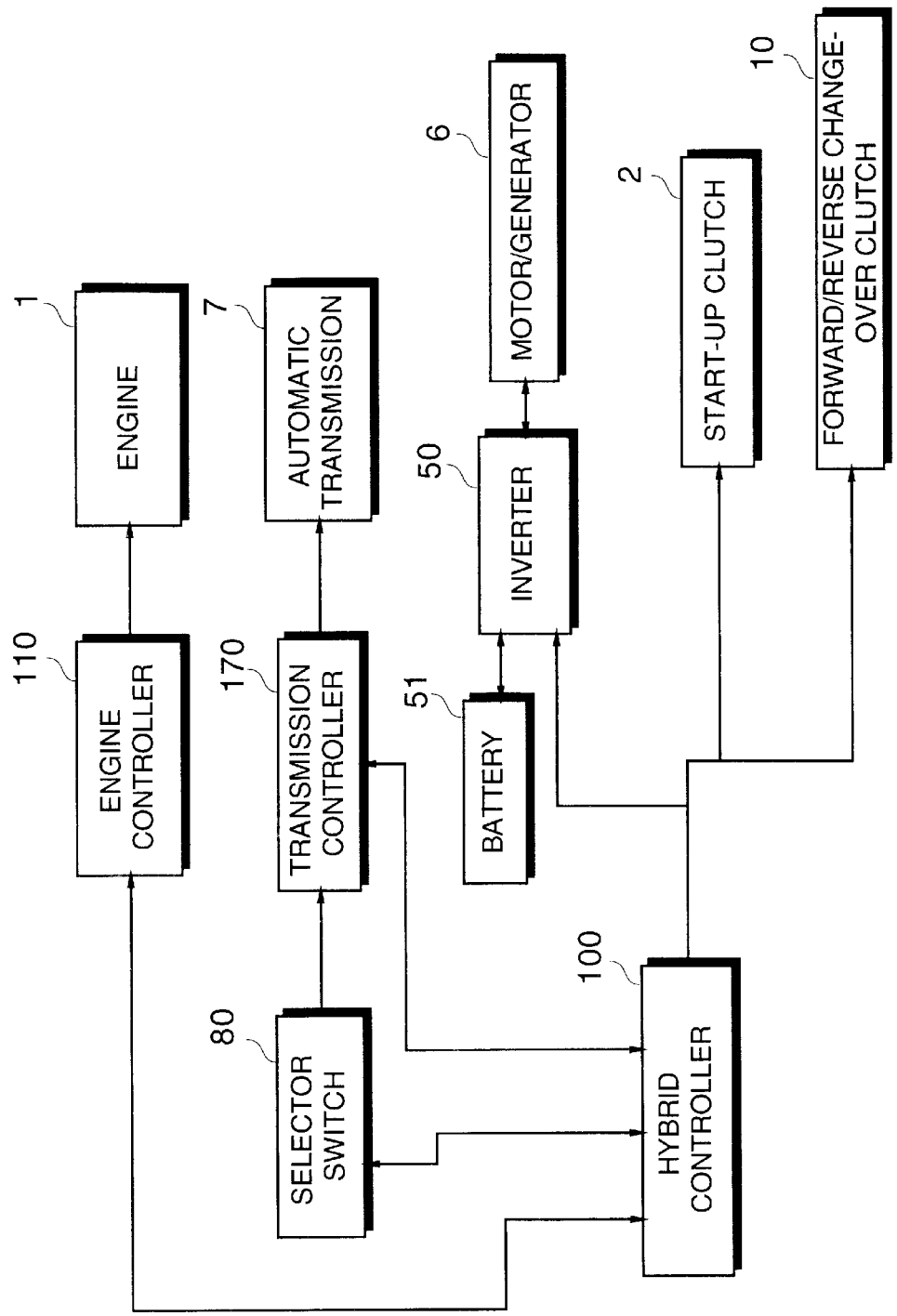
FIG. 3 is a block diagram of a control system of the drive force transmission mechanism according to this invention.

A control routine for the drive force transmission mechanism will be described below with reference to FIG. 3.

The engine 1 is controlled by an engine controller 110. The engine controller 110 stops and starts the engine 1 based on a signal from the hybrid controller 100. A fuel injection amount and an ignition timing of the engine 1 are controlled in response to operational conditions when the engine 1 is running.

For example, when the vehicle is stationary, coasting or decelerating, fuel is economized by cutting fuel injection. Fuel injection is also cut at low vehicle speeds below a predetermined vehicle speed, and the vehicle runs only on the motive force of the motor/generator 6.

In situations in which the drive force of the engine 1 is not required for vehicle running, the hybrid controller 100 charges the battery 51 as a state of charge SOC of the battery 51 becomes low by starting the engine 1 with an engine controller 110 and driving the motor/generator 6 as a generator.

The speed ratio of the automatic transmission 70 is controlled by a transmission controller 170. A signal from a selector switch 80 which detects an operation range of the vehicle that is selected by a selector lever i, a command signal from the hybrid controller 100 and a signal indicative of vehicle operational conditions such as vehicle speed, throttle opening or the like are input to the transmission controller 170.

The transmission controller 170 calculates a target speed ratio on the basis of these signals and controls the speed ratio of the automatic transmission 7 to a target speed ratio. The selector lever comprises a D range which designates a forward running mode, an R range which designates a reverse running mode, an N range which designates a neutral running mode and a P range which designates a stationary mode The selector switch 80 inputs a signal expressing the selected operation range of the vehicle into the transmission controller 170 and the hybrid controller 100.

The hybrid controller 100 engages and disengages the start-up clutch 2, changes over the forward/reverse change-over clutch 10 and controls the motor/generator 6 through the inverter 50 in response to the selected operation range of the vehicle, the throttle opening of the engine 1 and the state of charge SOC of the battery 51.

The hybrid controller 100, the engine controller 110 and the transmission controller 170 respectively comprise a microcomputer which comprises a central processing unit (CPU), a read only memory (ROM), a random access memory (RAM) and an input/output interface (I/O interface).

It is possible to provide the controllers 100, 110, 170 in a single computer.

Control by the hybrid controller 100 of the drive force transmission mechanism and the motor/generator 6 will be described below referring to FIGS. 4–14.

Figure 4:
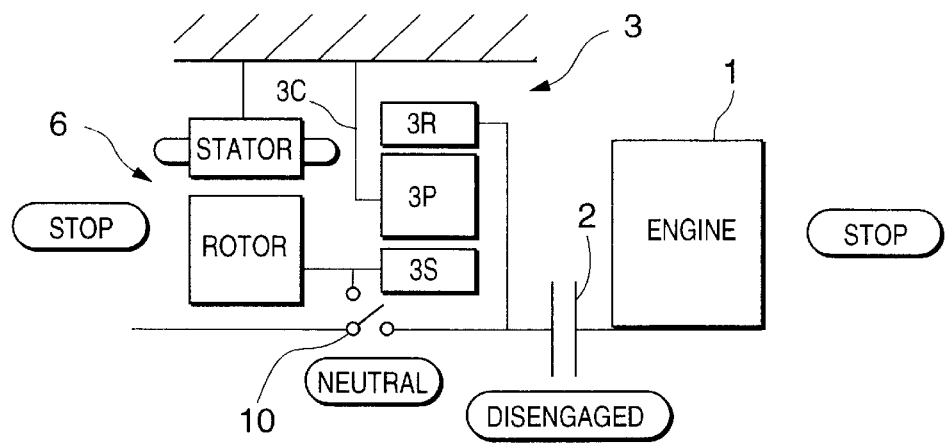
FIG. 4 is a schematic diagram of the drive force transmission mechanism in a state where the vehicle is stationary.

Firstly referring to FIG. 4, when the select lever is in a parking range, the hybrid controller 100 disengages the start-up clutch 2 and maintains the forward/reverse changeover clutch 10 at a neutral position.

The input shaft 5 of the automatic transmission 7 is disconnected from the engine 1 and from the motor/generator 6.

Figure 5:
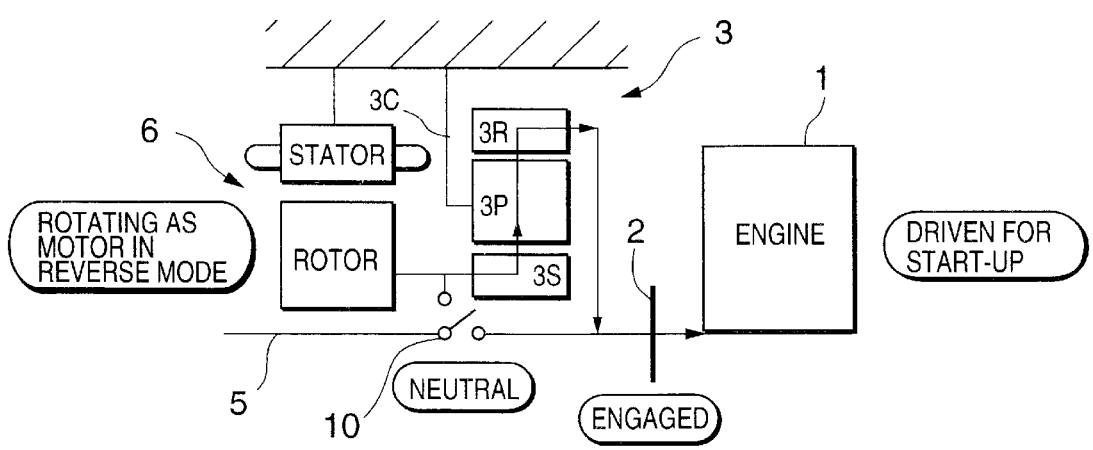
FIG. 5 is a schematic diagram of the drive force transmission mechanism in a state where engine start-up is performed.

In the P range, when the ignition key (not shown) which is provided in the vehicle is in the ON position, the hybrid controller 100 engages the start-up clutch 2 as shown in FIG. 5. When the motor/generator 6 is operated in this state, the rotational output is transmitted the engine 1 through the planetary gear set 3 to start the engine 1 as shown by the arrow in the figure.

The rotations of the motor/generator 6 are transmitted to the ring gear 3R through the planet gears 3P from the sun gear 3S of the planetary gear mechanism 36. Since the planet gears 3P are prevented from revolving by the planet carrier 3C fixed to the casing 11. The sun gear 3S and the ring gear 3R rotate in opposite directions.

The engine 1 rotates only in one direction. Since the motor/generator 6 is connected to the engine 1 via the planetary gear mechanism 3, the rotation direction is reversed when the rotation of the motor/generator 6 is transmitted to the engine 1, or vice versa. In the following explanation, when the rotation direction of the motor/generator 6 coincides with that of the engine 1 after it is reversed by the planetary gear mechanism 3, it is explained that the motor/generator 6 is operated in a reverse mode.

In other words, the reverse mode rotation of the motor/generator 6 corresponds to the rotation direction of the motor/generator 6 when it drives the vehicle rearwards via the forward/reverse change-over clutch 10 in the reverse position.

The gear ratio of the planetary gear set 3 is normally fixed since the planet gears 3P are prevented from revolving. As a result, as shown by the straight line in FIG. 14, the rotation speed input to the sun gear 3S from the motor/generator 6 is decreased by a fixed ratio and then output to the ring gear 3R.

Figure 6A:
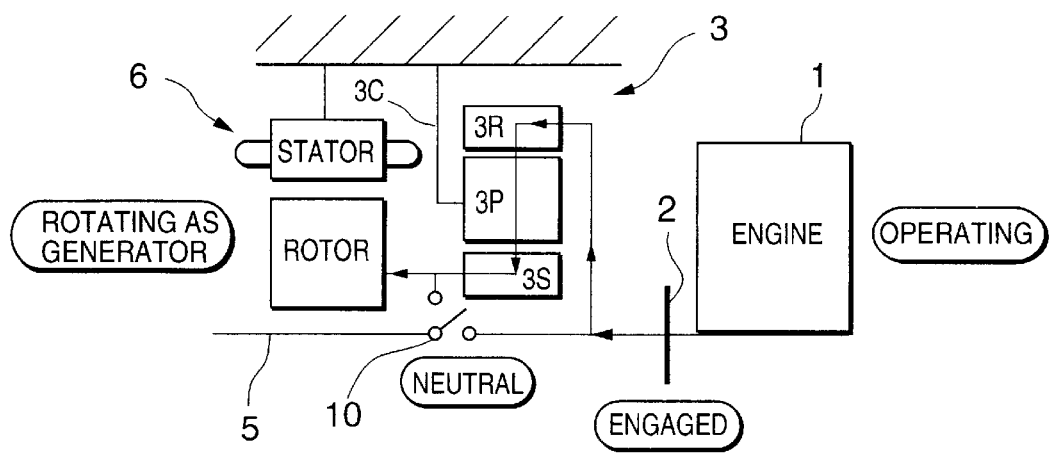
FIGS. 6A, 6B and 6C are schematic diagrams of the drive force transmission mechanism showing various operating states depending on a battery state of charge SOC when the vehicle is stationary.
Figure 6B:
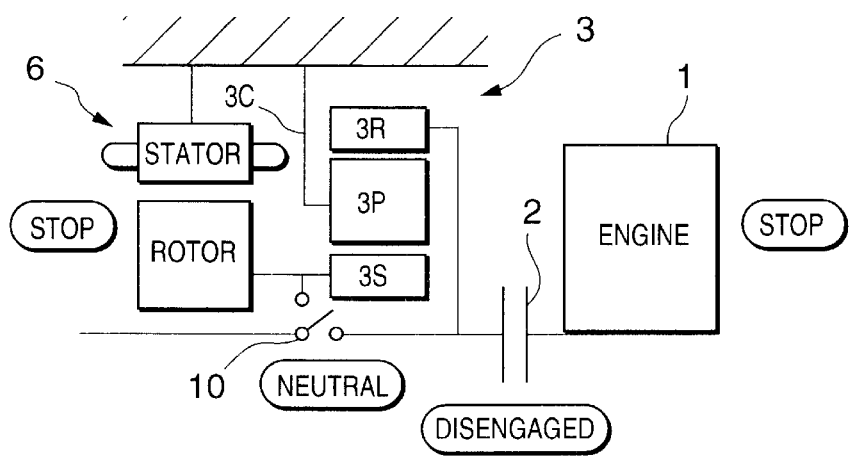
Figure 6C:
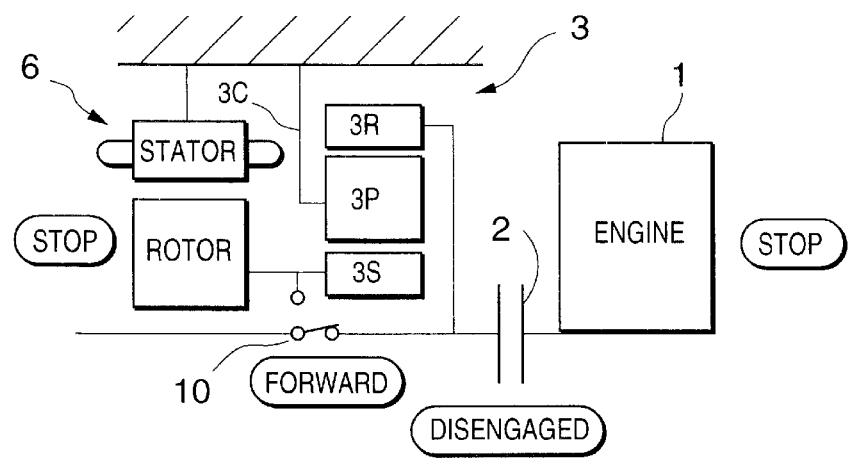

Referring now to FIGS. 6A–6C, when the vehicle is stationary, the hybrid controller 100 controls the start-up clutch 2, the forward/reverse change-over clutch 10 and the motor/generator 6 in the manner described hereafter in response to the state of charge SOC of the battery 51 and the operation range of the vehicle detected by the selector switch 80.

When the operation range is the N range and the state of charge SOC of the battery 51 is lower than or equal to a fixed value, the hybrid controller 100 operates the motor/generator 6 in reverse mode by a start-up process which is described above and starts the engine 1. Next the engine 1 is operated with the start-up clutch 2 engaged and the forward/reverse change-over clutch 10 remaining in the neutral position. The inverter 50 controls the motor/generator 6 to operate as a generator using the rotational output of the engine 1 input to the motor/generator 6 from the planetary gear set 3. The current generated by the motor/generator 6 is fed through the inverter 50 and used to charge the battery 51.

When the operation range is the N range and the state of charge SOC of the battery 51 is higher than the fixed value, the hybrid controller 100 disengages the start-up clutch 2, and the forward/reverse change-over clutch 10 is placed in the neutral position as shown in FIG. 6B. If the engine 1 is operating, the hybrid controller 100 stops the operation of the engine 1.

When the operation range is the D range and the state of charge SOC of the battery 51 is higher than the fixed value, the hybrid controller 100 disengages the start-up clutch 2, and retains the forward/reverse changeover clutch 10 in the forward position as shown in FIG. 6C. If the engine 1 is operating, the hybrid controller 100 stops the operation of the engine 1.

Figure 7:
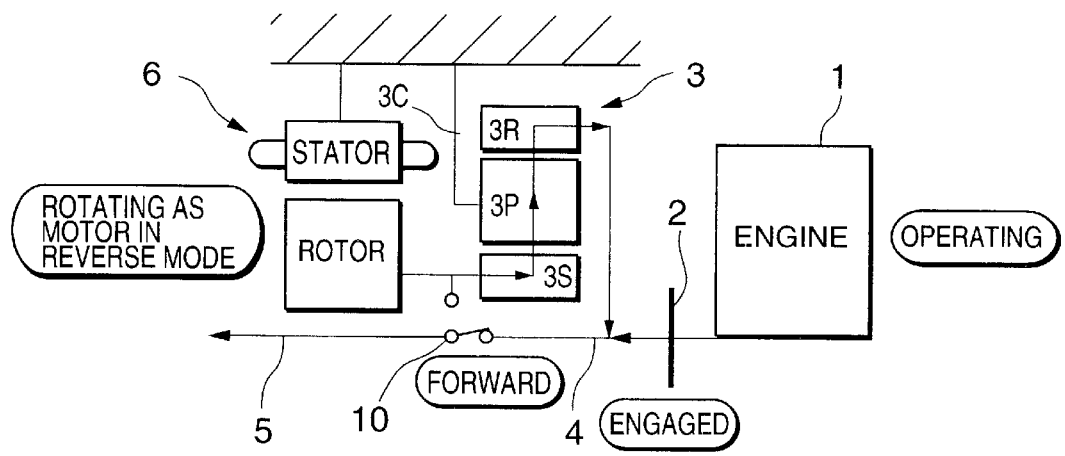
FIG. 7 is a schematic diagram of the drive force transmission mechanism in a state where the vehicle is about to move forward.

When the vehicle starts in the D range, that is to say, when the accelerator pedal is depressed in the D range, if the engine 1 is stopped, the hybrid controller 100 firstly starts the engine 1 as shown in FIG. 5. Next as shown in FIG. 7, the start-up clutch 2 is engaged and the forward/reverse change-over clutch 10 is changed over to the forward position. The motor/generator 6 continues to operate in reverse mode as in the case of engine start-up. As a result, the output of the engine 1 and the output of the motor/generator 6 passing through the planetary gear set 3 are input to the automatic transmission 7. As the rotation speed of the engine 1 is low when it drives the vehicle to start, thermal-efficiency of the engine 1 is also low. By assisting the engine 1 by the motor/generator 6 to make the vehicle start, fuel consumption of the engine 1 is minimized.

Figure 14:
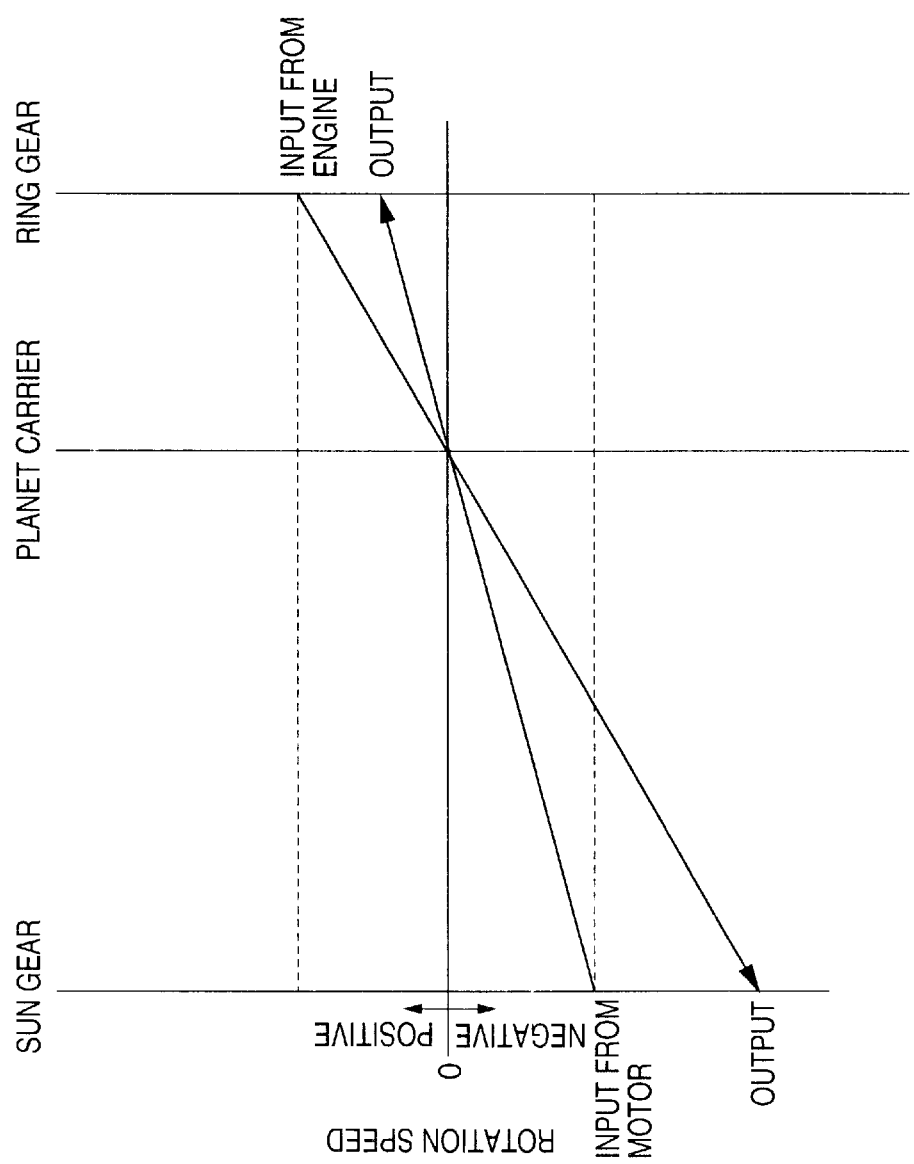
FIG. 14 is a diagram describing the relationship of a rotation speed and a direction of rotation of a sun gear, a ring gear and a planet carrier of a planetary gear set according to this invention.

During the above control, the output of the motor/generator 6 is transmitted to the output shaft 4 of the start-up clutch 2 through the sun gear 3S, planet gears 3P and ring gear 3R of the planetary gear mechanism 3. As shown in FIG. 14, since the rotation speed of the motor/generator 6 is reduced by the planetary gear set 3, the torque of the motor/generator 6 is actually amplified and output to the output shaft 4 of the start-up clutch 2. Thus in comparison to connecting the motor/generator 6 directly to the engine 1, the rotation speed of the motor/generator 6 is higher when it assists the engine 1. Due to the higher rotation speed, the motor/generator can exert a larger torque on the output shaft 4 than in the case where the motor/generator is directly connected to the engine. In other words, a small light-weight motor/generator 6 can provide a sufficient torque according to this drive force transmission mechanism.

Figure 8:
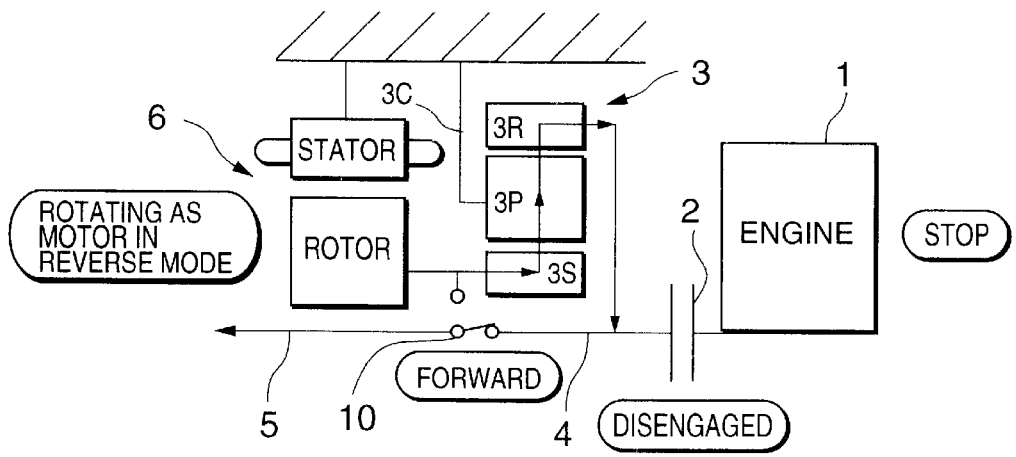
FIG. 8 is a schematic diagram of the drive force transmission mechanism in a state where the vehicle is running on a motor/generator.

Another possible operation of the drive force transmission mechanism to start the vehicle will be described with reference to FIG. 8. In this case, the engine 1 remains stopped, the start-up clutch 2 is disengaged and the forward/reverse change-over clutch 10 is changed over to the forward position.

The motor/generator 6 is operated in reverse mode. Thus the vehicle moves forward only using the motive force of the motor/generator 6. However since torque is amplified due to the decrease in rotation speed due to the action of the planetary gear set 3, it is possible to obtain a required torque during start-up or subsequent acceleration with a small light-weight motor/generator 6. In comparison to directly connecting the motor/generator to the engine, this arrangement also allows the operation of the motor/generator 6 to be performed in a high-efficiency rotation speed region since the rotation speed of the motor/generator 6 is high.

Figure 9:
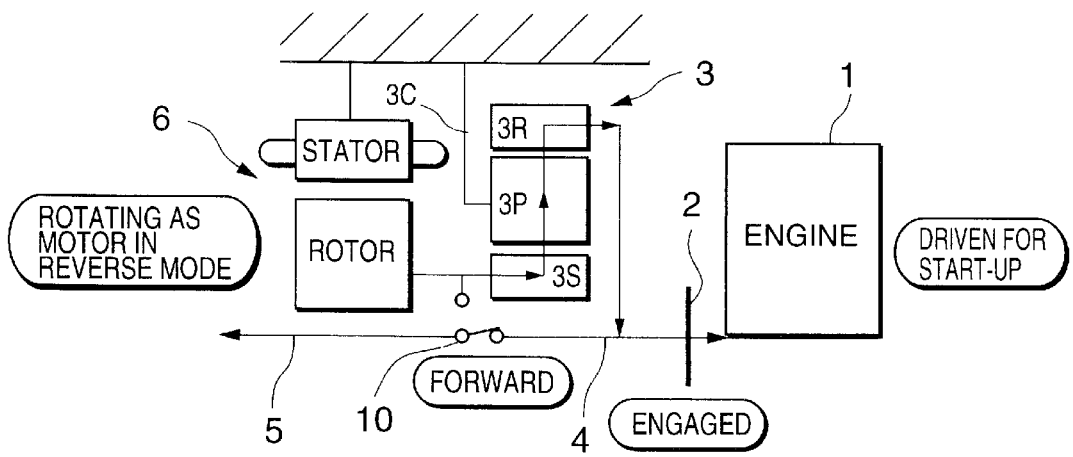
FIG. 9 is a schematic diagram of the drive force transmission mechanism during engine start-up while the vehicle is running forward.

When the vehicle initiates start-up with the engine 1 stopped, the engine 1 is started later while the vehicle is in travel. In this case, the hybrid controller 100 simply engages the start-up clutch 2 as shown in FIG. 9. As a result, a part of the rotational output of the motor/generator 6 which drives the vehicle is used for engine start-up. Once the engine has started driving the vehicle, the hybrid controller 100 may stop the operation of the motor/generator 6 as a motor.

Figure 10A:
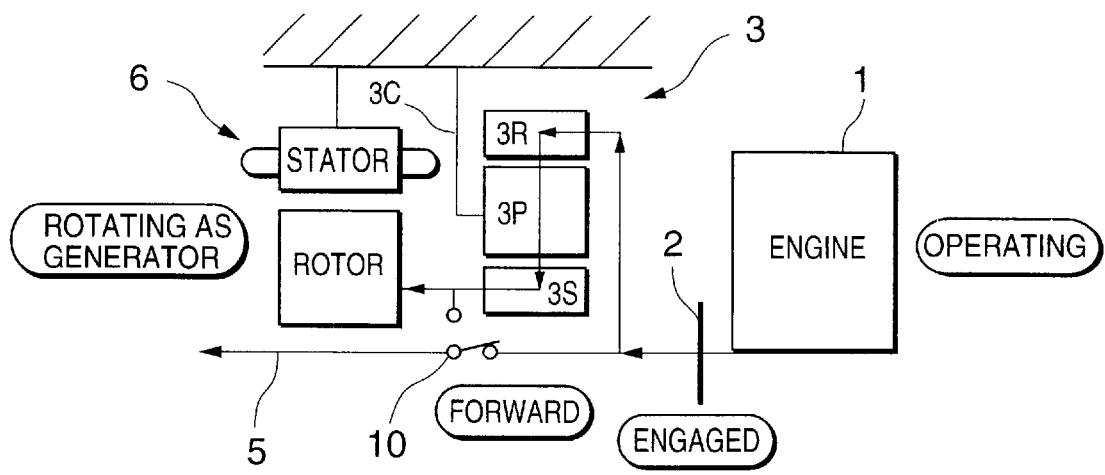
FIGS. 10A and 10B are schematic diagrams of the drive force transmission mechanism showing different operation states depending on the battery state of charge SOC when the vehicle is running forward.
Figure 10B:
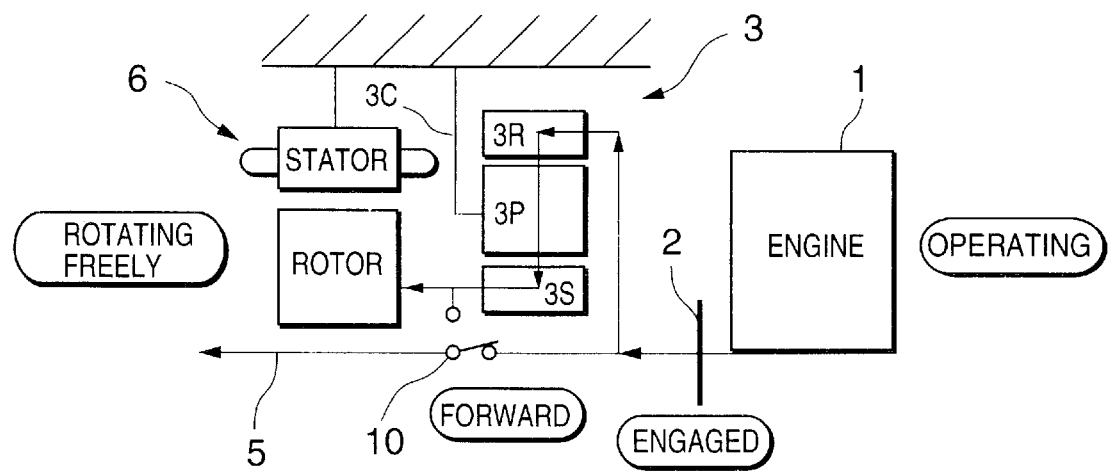

When the vehicle is in steady-state running by the drive force of the engine 1, the hybrid controller 100 selectively applies the two operational states of the motor/generator 6 as shown in FIGS. 10A and 10B depending on the state of charge SOC of the battery 51. In either case, the hybrid controller 100 engages the start-up clutch 2 and retains the forward/reverse change-over clutch 10 in the forward position.

When the state of charge SOC of the battery 51 is lower than or equal to the fixed value, the hybrid controller 100 uses a part of the rotational output of the engine 1 to use the motor/generator 6 as a generator by control of the inverter 50. This generated current is used to charge the battery 51.

When the state of charge SOC is higher than the fixed value, generation of electricity by the motor/generator 6 is not performed since the hybrid controller 100 allows the motor/generator 6 to freely rotate without generating power by the control of the inverter 50 as shown by FIG. 10B.

Figure 11A:
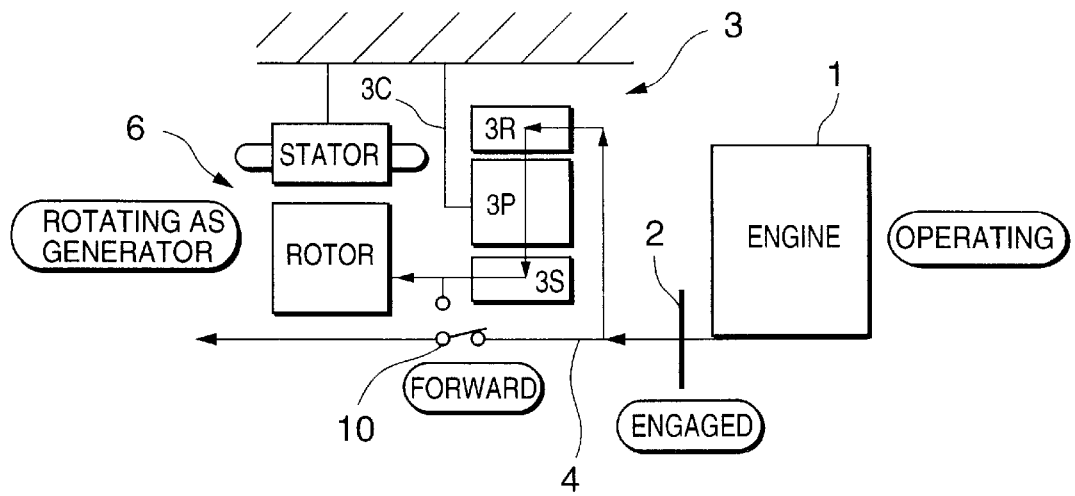
FIGS. 11A and 11B are schematic diagrams of the drive force transmission mechanism showing different operation states depending on the battery state of charge SOC when the vehicle is accelerating.
Figure 11B:
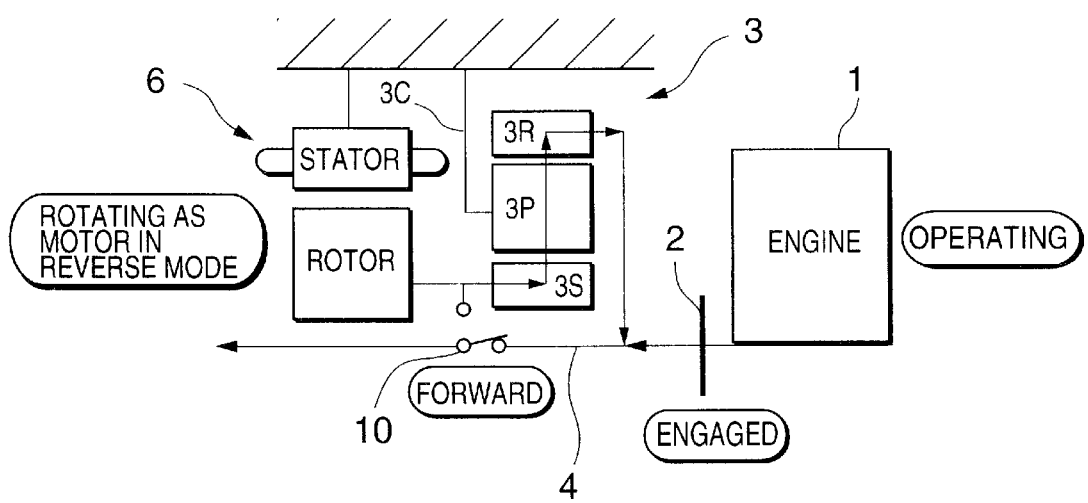

When the vehicle shifts from steady-state running to acceleration, that is to say, when the accelerator pedal is further depressed, the hybrid controller 100 selectively applies the two operational states of the motor/generator 6 as shown in FIGS. 11A and 11B depending on the state of charge SOC of the battery 51. In either case, the hybrid controller 100 engages the start-up clutch 2 and retains the forward/reverse change-over clutch 10 in the forward position in a similar manner to control during steady-state running.

When the state of charge SOC of the battery 51 is lower than or equal to the fixed value, the hybrid controller 100 uses a part of the rotational output of the engine 1 and drives the motor/generator 6 as a generator to charge the battery 51. This is basically the same as the state shown in FIG. 10A which is applied to the state of charge SOC below the fixed value during steady-state running. In this case, both the acceleration of the vehicle and the power generation by the motor/generator 6 are performed using the output power of the engine 1.

When the state of charge SOC is higher than the fixed value, the hybrid controller 100 uses the motor/generator 6 as a motor in reverse mode as shown in FIG. 11B and assists the drive force of the engine 1 by inputting the rotations to the output shaft 4 of the start-up clutch 2 through the planetary gear set 3.

Since the rotational output of the motor/generator 6 is reduced by the planetary gear set 3 as explained above, amplified torque of the motor/generator 6 is input to the output shaft 4. Thus in comparison to connecting the motor/generator 6 directly to the engine 1, it is possible to assist the engine 1 with a sufficient torque with a small light-weight motor/generator 6.

Figure 12A:
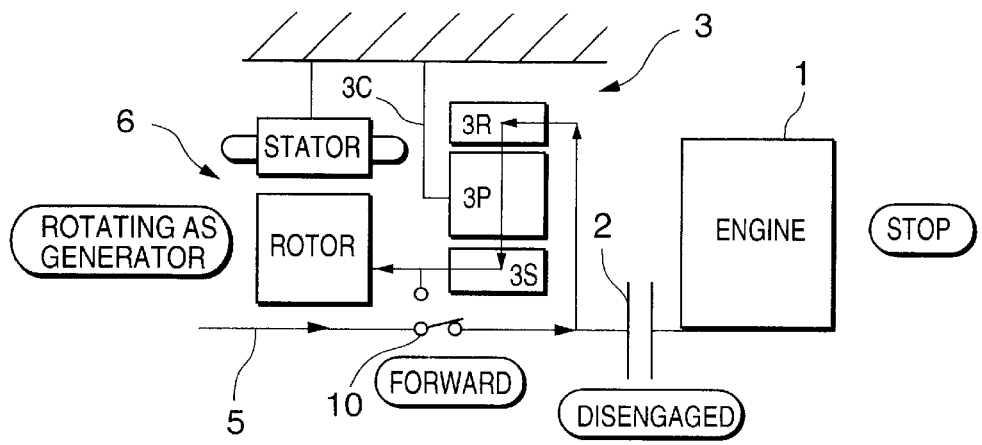
FIGS. 12A, 12B and 12C are schematic diagrams of the drive force transmission mechanism showing various operation states depending on the battery state of charge SOC when the vehicle is decelerating.
Figure 12B:
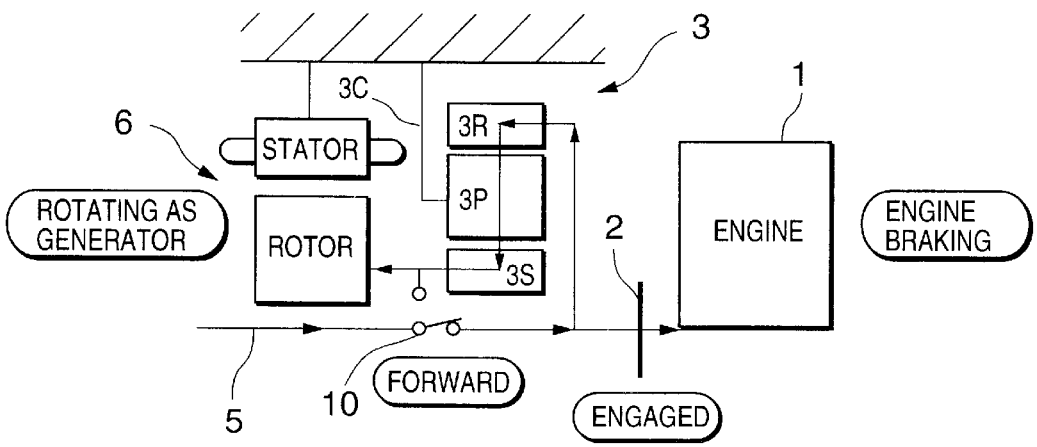

During deceleration, regeneration of electrical energy is performed by the motor/generator 6 using the rotational torque input to the automatic transmission 7 from the drive wheels as shown in FIGS. 12A and 12B.

During this control, when the state of charge SOC of the battery 51 is lower than or equal to the fixed value, the hybrid controller 10 disengages the start-up clutch 2, and retains the forward/reverse change-over clutch 10 in the forward position as shown in FIG. 12A. At this time, the rotation of the drive wheels is transmitted to input shaft 5 of the automatic transmission 7. After the rotation speed is increased by the planetary gear set 3, it is input to the motor/generator 6. The motor/generator 6 uses this rotational force to generate power in order to charge the battery 51. The motor/generator 6 can therefore generate power in a high generation-efficiency rotation speed region since the rotation speed of the input shaft 5 is increased by the planetary gear set 3. Furthermore a regenerative braking due to the resistance of the motor/generator 6 in power generation is applied by the motor/generator 6 to the drive wheels.

Alternatively as shown in FIG. 12B, it is possible to engage the start-up clutch 2 and retain the forward/reverse switching clutch 10 in the forward position. In this case, the motor/generator 6 is rotated by the input rotations from the planetary gear set 3 which makes the motor/generator 6 generate power. On the other hand, the engine 1 is also rotated by the rotational force input from the drive wheels through the automatic transmission 7 and thus an engine brake is applied to the drive wheels in addition to the regenerative braking force by the motor/generator 6.

Figure 12C:
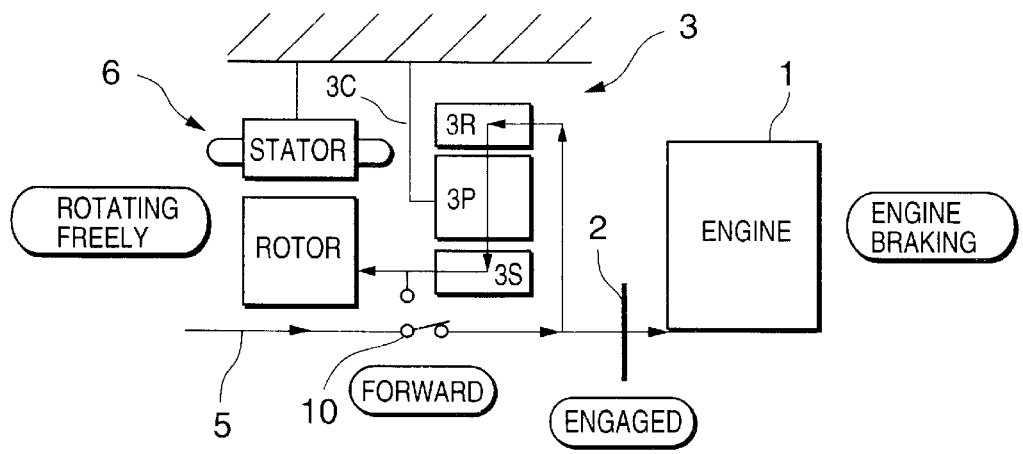

When the state of charge SOC of the battery 51 is higher than the fixed value, the hybrid controller 100 engages the start-up clutch 2 and retains the forward/reverse switching clutch 10 in a forward position as shown in FIG. 12C. In this case, the motor/generator 6 does not generate power due to control of the inverter 50 by the hybrid controller 100. Thus in the same way as shown in FIG. 12B, the motor/generator 6 is rotated by the input rotations through the planetary gear set 3. However since power generation is not performed at this time, the motor/generator 6 rotates freely without resistance. As a result, regenerative braking does not result and only the engine brake is applied to the drive wheels.

Finally, the operation of the drive force transmission mechanism when the vehicle is reversing will be described with reference to FIGS. 13A–13C.

Figure 13A:
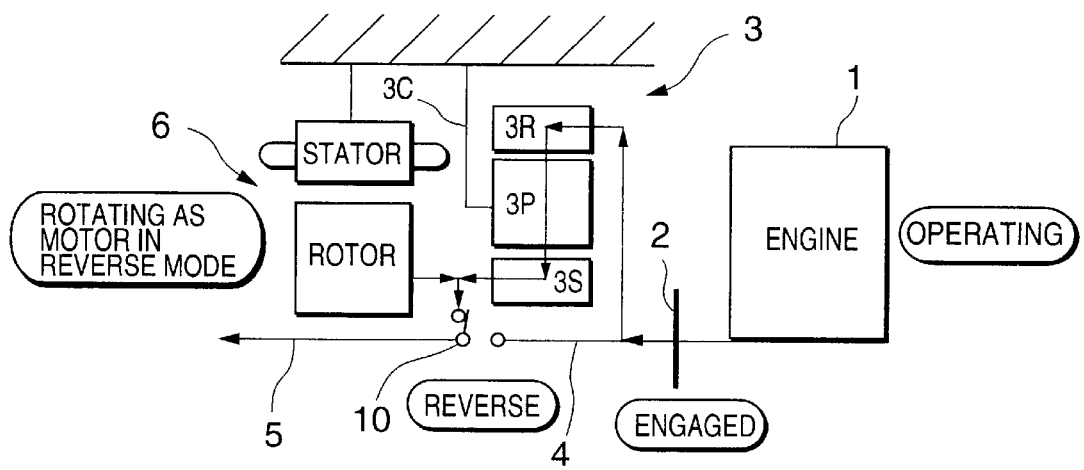
FIGS. 13A, 13B and 13C are schematic diagrams of the drive force transmission mechanism showing various operation states when the vehicle is in reverse motion.

When the vehicle is reversing, the hybrid controller 100 engages the start-up clutch 2 and changes over the forward/reverse change-over clutch 10 to the reverse position as shown in FIG. 13A.

The drive force of the engine 1 and the drive force of the motor/generator 6 are both input into the automatic transmission 7 through the forward/reverse change-over clutch 10 and the input shaft 5.

Although the rotational direction of the motor/generator 6 is the same as that during forward motion, the rotations of the motor/generator 6 are directly input to the input shaft 5 without passing through the planetary gear set 3. As a result, the direction of rotation of the input shaft 5 is opposite to that during forward motion. On the other hand, since the rotation of the engine 1 is transmitted to the input shaft 5 through the planetary gear set 3, the direction of the rotation of the engine 1 is also reversed before it is input to the input shaft 5. Though the rotation directions of the motor/generator 6 and engine 1 are identical to those in the forward motion, the direction of the rotation of the input shaft 5 is reversed in the reverse motion. In the reverse motion, the speed of the rotation of the engine 1 is increased by the planetary gear set 3 before it is input to the input shaft 5 as shown in FIG. 14.

In this situation, the rotation speed of the motor/generator 6 is transmitted to the input shaft 5 without being decreased by the planetary gear set 3 in contrast to the case where the vehicle starts to move forward that is shown in FIG. 7. Thus, when the vehicle starts to move rearward it is necessary to reduce the rotation speed of the motor/generator 6 to the same extent as in the case where the vehicle starts to move forward. The reduction is performed by the hybrid controller 100 by control of the inverter 50.

Figure 13B:
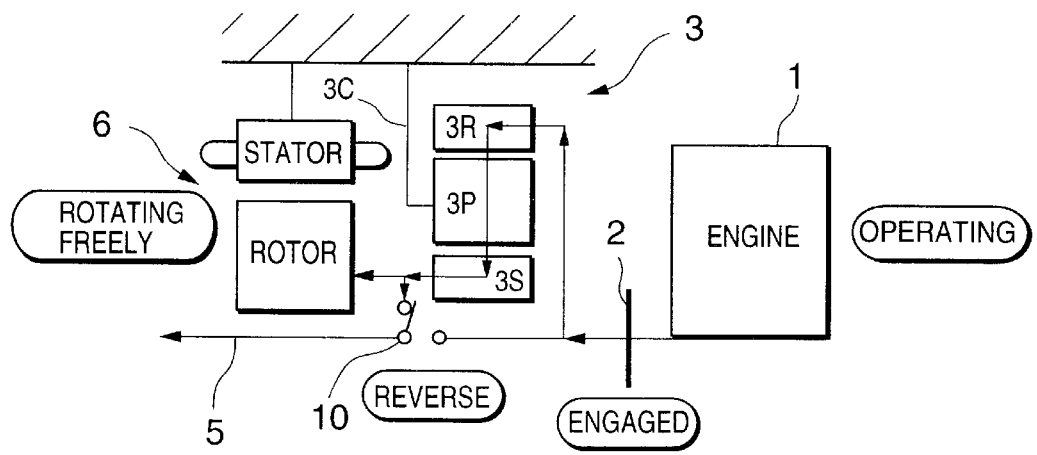
Figure 13C:
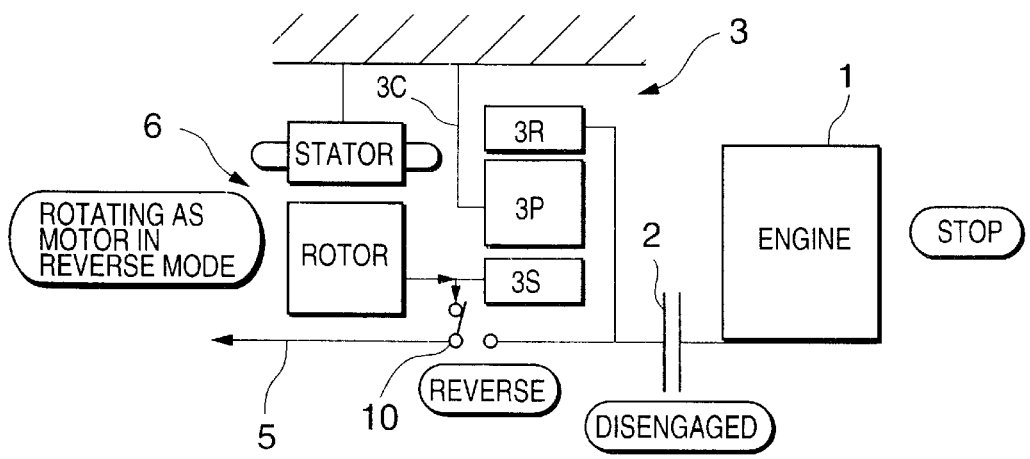

After the vehicle started to move rearward, the hybrid controller 100 cuts off the supply of current to the motor/generator 6 by controlling the inverter 50 as shown in FIG. 13B. As a result, the motor/generator rotates freely without resistance in accordance with the rotation of the sun gear 3S and the vehicle is driven rearward only with the drive force of the engine 1.

It is possible that the engine 1 can not be started up for some reasons. In such a case, the hybrid controller 100 retains the forward/reverse change-over clutch 10 in the reverse position and disengages the start-up clutch 2 as shown in FIG. 13C. Thus it is still possible to drive the vehicle rearward only with the output of the motor/generator 6.

As described above, a drive force transmission mechanism according to this invention connects an output shaft 4 of a start-up clutch 2 and a rotation shaft 30 of a motor/generator 6 through a planetary gear set 3 and selectively engages the input shaft 5 of the automatic transmission 7 to the output shaft 4 and the rotation shaft 30 through a forward/reverse change-over clutch 10. During the forward motion of the vehicle, the rotation speed of the output of the motor/generator 6 is decreased by the planetary gear set 3 to assist the drive force of the engine 1. Therefore during the forward motion of the vehicle, either for vehicle start or acceleration, the motor/generator 6 is operated in a high-efficiency high rotation speed region. As a result, it is possible to obtain a suitably large torque for vehicle start or acceleration using a small light-weight motor/generator 6.

Since the change-over of forward/reverse motion of the vehicle is performed using, for example, a simple dog clutch in this drive force transmission mechanism, a forward/reverse change-over mechanism as used in the prior art device is not required.

Figure 15:
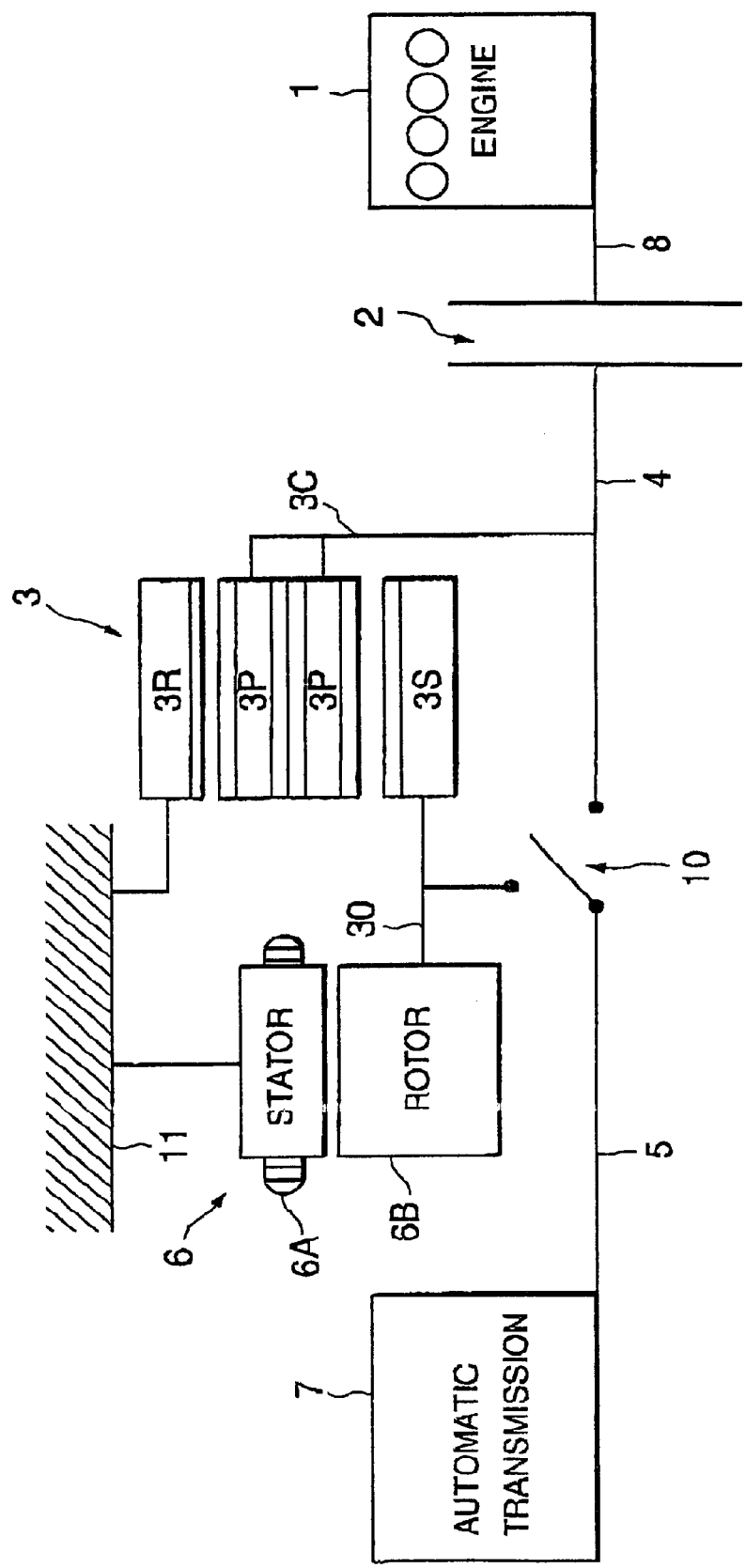
FIG. 15 is a schematic diagram of the drive force transmission mechanism according to another embodiment of this invention.

The planet gears 3P of the planetary gear set 3 may comprise single pinions as in the above embodiment or double pinions as shown in FIG. 15. In the latter case, a ring gear 3R is fixed to the casing 11 and a planet carrier 3C is engaged with the output shaft 4 of the start-up clutch 2.

The contents of Tokugan Hei 2000-60579 with a filing date of Mar. 6, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A drive force transmission mechanism for a hybrid vehicle, the hybrid vehicle comprising an engine and a motor/generator as a motive force source, the mechanism comprising a first clutch connected to the engine, the first clutch comprising an output shaft that rotates together with the engine when the first clutch is engaged;

a planetary gear set connecting the motor/generator to the output shaft;

an automatic transmission comprising an input shaft, the hybrid vehicle running in accordance with an output rotation of the automatic transmission; and a second clutch selectively connecting the input shaft to the motor/generator and to the output shaft.

2. The drive force transmission mechanism as defined by claim 1, wherein the planetary gear set comprises a sun gear connected to the motor/generator, a ring gear connected to the output shaft, a planet gear meshing with the sun gear and the ring gear, and a fixed planet carrier supporting the planet gear free to rotate while preventing the planet gear from revolving around the sun gear.

3. The drive force transmission mechanism as defined by claim 1, wherein the planetary gear set comprises a sun gear connected to the motor/generator, a fixed ring gear, a planet gear comprising a pair of intermission pinions, one of the pinions being meshed with the sun gear and the other of the pinions being meshed with the ring gear, and a planet carrier supporting the pinions free to rotate and free to revolve around the sun gear as the ring gear and the sun gear relatively rotate, the planet carrier being connected to the output shaft.

4. The drive force transmission mechanism as defined by claim 1, wherein a gear ratio of the planetary gear set is set to cause a rotation speed of the motor/generator to be larger than a rotation speed of the output shaft.

5. The drive force transmission mechanism as defined by claim 1, wherein the second clutch comprises a dog clutch.

6. The drive force transmission mechanism as defined by claim 1, wherein the second clutch is a clutch which switches between a forward position in which the input shaft is connected to the output shaft, a reverse position in which the input shaft is connected to the motor/generator and a neutral position in which the input shaft is not connected to any of the output shaft and the motor/generator.

7. The drive force transmission mechanism as defined by claim 1, wherein the automatic transmission comprises a continuously variable transmission.

* * * * *